Jan. 17, 1956     C. C. J. THELANDER     2,731,096

DRIVEN CASTER WHEEL FOR A LAWN MOWER

Filed March 16, 1953

*INVENTOR.*
CLEMENT C.J. THELANDER
BY
*Merrill M. Blackburn*

ATTORNEY

United States Patent Office 2,731,096
Patented Jan. 17, 1956

2,731,096

DRIVEN CASTER WHEEL FOR A LAWN MOWER

Clement C. J. Thelander, Prophetstown, Ill., assignor to Buffalo-Eclipse Corporation, North Tonawanda, N. Y., a corporation of New York Application March 16, 1953, Serial No. 342,483

2 Claims. (Cl. 180—19)

The present invention relates to drive and steering mechanism for a lawn mower of the type utilizing a blade rotating on a vertical rotary shaft, although it may be used with other types; for example, with a reel type of mower. It is an object of this invention to provide a mower of the type indicated having a trailer wheel or wheels which may drive the mower while the latter is being steered, and thus to improve upon the mechanism of a mower of the type described.

In the drawings annexed hereto and forming a part hereof,

Figure 1:
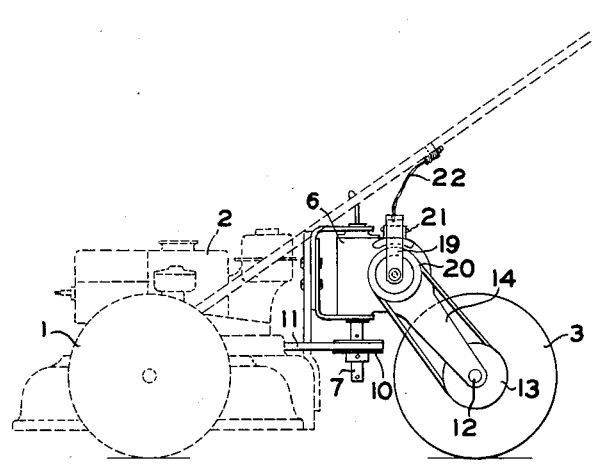
Fig. 1 is a side elevation of a mower, shown in broken lines, and the drive and steering mechanism, shown in solid lines to emphasize what is new.

A lawn mower of the type described has a pair of carrying wheels 1 and a power unit 2, to which is pivotally connected a caster assembly including a drive wheel 3. A bracket 4 is mounted on the power unit 2, and on this bracket 4 is mounted an adjustable two-arm bracket 5. Within this adjustable bracket 5, which is U-shaped, is pivotally mounted a gear casing or housing 6. A shaft 7 pivotally connects the housing 6 to the adjustable bracket 5 and it carries a worm 8 which meshes with a gear 9. The shaft 7 also carries a belt pulley 10, by which power is transmitted from the power unit 2 through belt 11 which runs over the belt pulley 10.

As heretofore indicated, the shaft 7 is driven by the belt 11 and drives the worm 8 by which the gear 9 is rotated. The gear 9 rotates shaft 15 which drives belt pulley 16. The belt pulley 16 drives belt pulley 13, through belt 17 and, hence, propels the lawn mower. Bracket or wheel-mounting arm 14 is divided and secured to the gear casing 6. The lawn mower is steered by a handle secured to the mower, but it is held in upright position by the drive wheel 3 and bracket arm 14.

The drive wheel 3 has an axle 12 and on this axle is the belt pulley 13. The bracket arm 14 is mounted on the ends of the axle 12 and is connected with the gear casing 6 in which the worm gearing 8, 9 is located. The shaft 15 extends through the gear casing 6 and has the belt pulley 16 mounted thereon. Since the shaft 7 acts as a pivot, the gear casing 6 and the bracket arm 14 may turn on this pivot as the mower is steered, and the bracket arm 14 is capable of turning through approximately one hundred and eighty degrees (180°).

Figure 4:
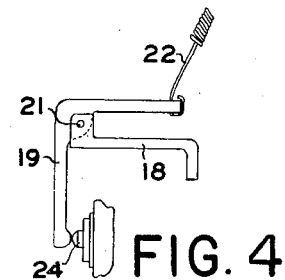
Fig. 4 is a detached elevation of an operating mechanism for a clutch for controlling the application of power.
Figure 2:
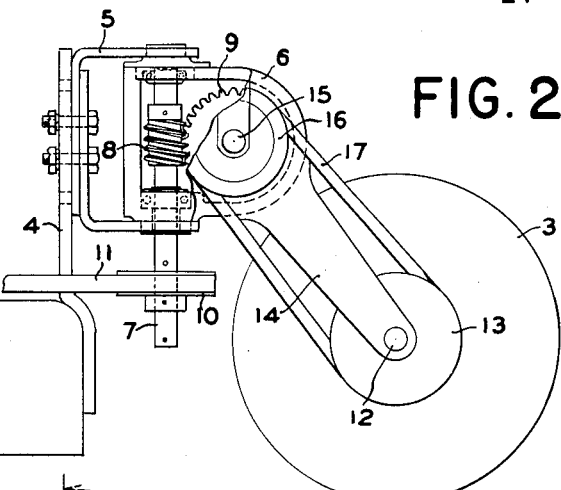
Fig. 2 is an enlarged side elevation of the drive and steering mechanism with parts thereof broken away.
Figure 3:
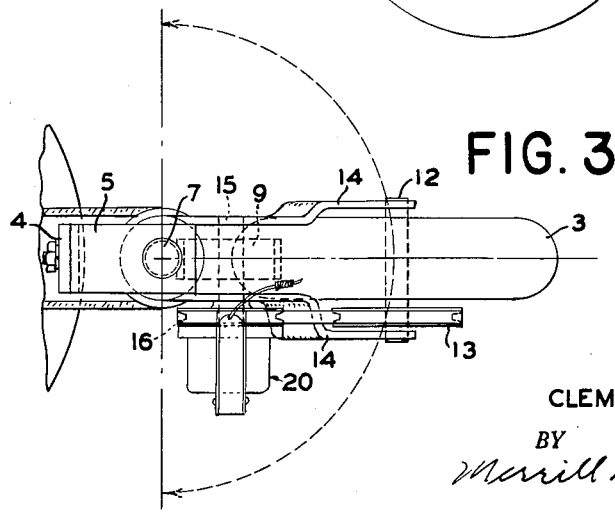
Fig. 3 is a plan view of the structure shown in Fig. 2.
Figure 5:
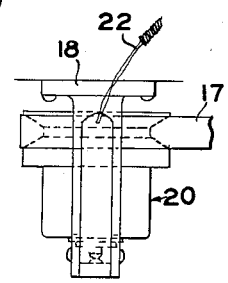
Fig. 5 is a plan view of the structure of Fig. 4.

A clutch operator 22, shown in Figs. 4 and 5, comprises a bracket 18 and a bell-crank lever 19. The bracket 18 is secured to the clutch housing 20 and has the bell-crank 19 pivotally connected thereto on a pivot 21. The clutch operator 22 is secured to a handle 23 and may cause the bell-crank 19 to press on a clutch member, as shown at 24. The structure, shown in Figs. 4 and 5, is a standard structure which can be purchased on the open market.

It is of course understood that the specific description of structure set forth above may be departed from without departing from the spirit of this invention as disclosed in this specification and as defined by the appended claims.

Having now described my invention, I claim:

1. A caster assembly for a lawn mower, comprising a first bracket for mounting on the lawn mower, an adjustable two-arm second bracket mounted on the first bracket with its two arms vertically spaced and extending horizontally, a gear housing disposed between said arms, an upright first shaft extending through the arms and through the housing and pivoting the housing to said second bracket, a pulley fixed to the lower end of said upright shaft for receiving input power, a second shaft journaled in the housing, gearing drivingly interconnecting the two shafts, a wheel-mounting arm secured to and depending from the housing, a third shaft mounted at the lower end of said wheel-mounting arm, a second pulley fixed to the second shaft, a third pulley on the third shaft, a ground-engaging wheel on the third shaft, and a belt trained about and interconnecting the second and third pulleys to drive the wheel, said wheel being drivingly connected to the third pulley.

2. The invention defined in claim 1, in which the upright shaft mounts the gear housing on the second bracket for lateral swinging approximately 90° to either side of a straight-ahead position.

References Cited in the file of this patent

UNITED STATES PATENTS

| 2,572,506 | Mongelli et al. | Oct. 23, 1951 |
| 2,582,177 | Swisher et al. | Jan. 8, 1952 |

FOREIGN PATENTS

| 2,884 | Great Britain | of A. D. 1911 |